M. SMITH.
METHOD AND APPARATUS FOR MANUFACTURING TIRES, HOSE, AND THE LIKE.
APPLICATION FILED DEC. 13, 1916.
1,269,229.  Patented June 11, 1918.
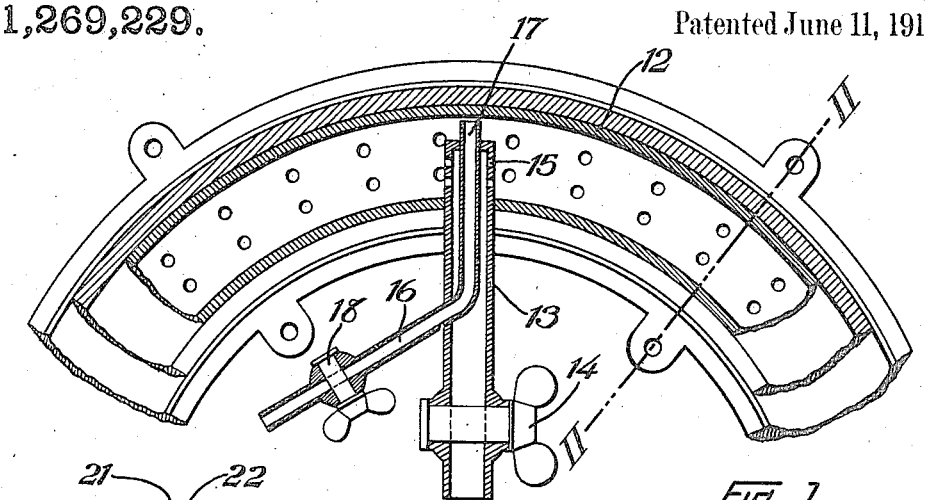
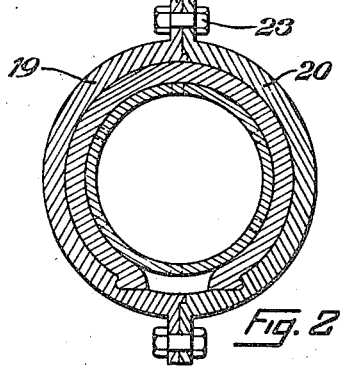
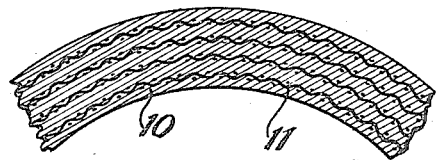
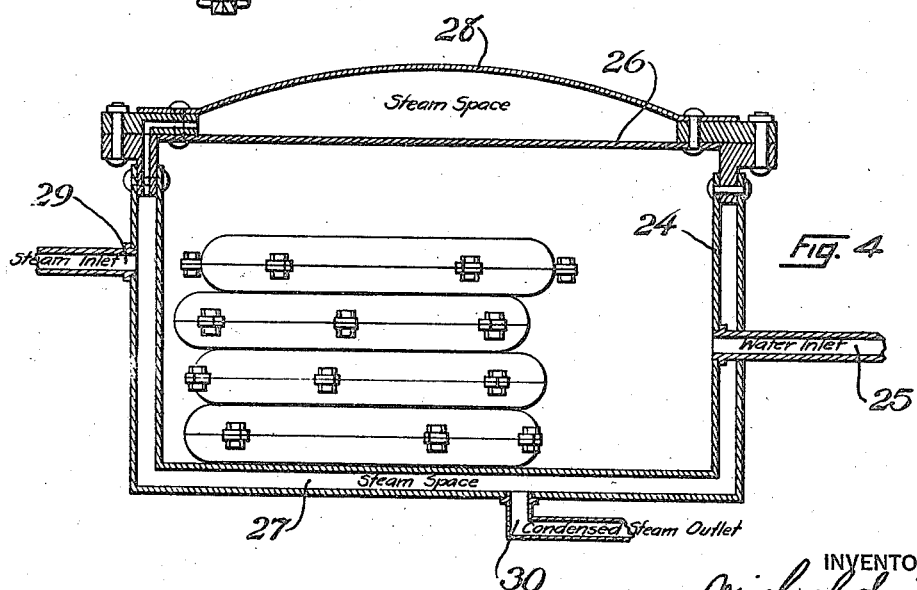
INVENTOR
Michael Smith
BY
Knightberg
ATTORNEYS

UNITED STATES PATENT OFFICE.

MICHAEL SMITH, OF PASSAIC, NEW JERSEY.

METHOD AND APPARATUS FOR MANUFACTURING TIRES, HOSE, AND THE LIKE.

1,269,229.

Specification of Letters Patent.

Patented June 11, 1918.

Application filed December 13, 1916. Serial No. 136,676.

*To all whom it may concern:*

Be it known that I, MICHAEL SMITH, a citizen of the United States, and resident of the city of Passaic, county of Passaic, and State of New Jersey, have invented certain new and useful Improvements in Methods and Apparatus for Manufacturing Tires, Hose, and the like, of which the following is a specification.

My invention relates in general to the manufacture of articles composed of superposed layers of rubber and cloth, such as for example tires, rubber hose and the like. More particularly, the invention resides in an improved method and apparatus for obtaining a more intimate contact and union of the rubber and cloth, whereby greater strength and durability in this class of articles may be gained.

The fundamental principle employed is to subject the exposed surface to the steady inelastic pressure of water or other liquid whereby the two or more layers are forced into positive uniform contact with each other at all points regardless of inequalities of surface, and with equal inelastic pressure in all directions.

To clearly illustrate the principles of the invention, I may refer to an embodiment thereof in the manufacture of vehicle tires. It will be understood, however, that the broader features of the invention are by no means limited to the manufacture of this particular article.

As is well known, there are two common methods of vulcanizing and integrating tires and the like. These methods, however, have certain disadvantages which will be pointed out. According to one method, the tire is built up on a solid metal core and is then placed in a mold which is made in half portions that are adapted to join at the outer circumference or tread portion of the tire. Considerable hydraulic pressure is then brought to bear on the sides of the mold so as to press it together and compress the constituents of the tire. This side pressure, to a certain extent, forces the unvulcanized plastic mass of rubber composition, which forms the tread, outward toward the line at which the molds join, and a comparatively small amount of direct pressure is brought to bear in the direction in which it is much needed, that is, from the tread portion in toward the center. Because of this fact, it is very difficult to produce a well united and durable tire. It is well known that during the process of vulcanizing the tire, the material of which it is composed shrinks somewhat. Furthermore, after the mold has been forced together, it is impossible to exert any further pressure on the inclosed tire. It will thus be apparent that when the tire is vulcanized, the shrinking of the material will draw it away from the mold and consequently the pressure of the mold will be somewhat relieved. This latter is quite undesirable because it increases the difficulty of making a proper unification of the different portions of the tire.

According to the other method, the tire is built up on a solid iron core, side plates are applied to the tire to receive the hydraulic pressure, and then both tire and plates are wrapped up with a ribbon of canvas under a pull of about fifty pounds. The tire is then subjected to hydraulic pressure upon the sides. The vulcanizing is done under a pressure of live steam raised to the temperature required to cure the particular compound used. This pressure bears upon all the wrapped portion of the tire not covered by the side plates. A disadvantage of this method lies in the fact that the amount of pressure must be governed by the heat which the compound will stand. A pressure of fifty pounds per square inch can hardly be obtained, and at the same time, owing to the elasticity of this pressure, gases are sometimes liberated in the vulcanizing mass. This gas collects in little pockets and may ruin the tire.

The object of the present invention is to overcome defects such as I have described and in order to do this, I have invented a method and device by means of which I am able to provide an equal and unyielding pressure of liquid upon all parts of both the inner and outer surfaces of the tires during the process of vulcanizing, while at the same time permitting the degree of heat to be applied to the tire which is necessary to cure the particular compound used. Apparatus suitable for carrying out the invention is shown in the accompanying drawing, in which—

Figure 1 is a section in the plane of a tire showing portions of a mold and a tire in process of construction;

Fig. 2 is a transverse view thereof on the line II—II of Fig. 1;

Fig. 3 is a transverse section of a portion of the tire material showing the superposed layers of fabric and rubber;

Fig. 4 is a sectional elevation of a vulcanizing tank with several filled molds disposed therein.

Referring in detail to said drawing:

The tire as shown in Fig. 3 is made up of a plurality of superposed layers of rubber 10 and fabric or cloth 11. It will be understood that the rubber may be of any desired form, such as a rubber composition and that the fabric or cloth may be for example canvas. The superposed layers are formed on an inner hollow and perforated form 12 into which is led a water pipe 13 provided with a control valve 14 and ports 15 whereby water is introduced inside the form and can pass through the perforated form into the desired contact with the inner surface of the tire. An air pipe 16 has its opening 17 at at a point above the termination of water pipe 13 and permits the escape of air displaced by the water introduced into the form. After the escape of air ceases, the stop cock 18 may be operated to shut off this pipe. The control valve 14 is at this time also closed so that the water after displacing all the air is confined within the form and tire. A pair of outer mold members 19, 20 are adapted to be united upon the outer surface of the tire by means of their perforated flanges or ears 21 and 22, through which bolts 23 pass. It will be understood that the form 12 and the mold members 19, 20 may be constructed of comparatively thin light material as the compression operation is to be accomplished by submerging the water-filled tire and mold in a surrounding body of water, after which the control valve 14 is opened to establish communication between the inner and outer water and thus equalizes the pressures to which the tire and mold are exposed.

The submerging of the filled molds is illustrated in Fig. 4. The individual molds are first filled, with the air escape port 17 uppermost, thus driving out all of the contained air, after which the two pipes are sealed by operating their control valves. The molds thus filled are successively placed in the inner tank 24 which is supplied with water under suitable pressure through the supply pipe 25. After the molds are submerged, the valves 14 of the tire forms are opened, so that whatever pressure is maintained in the tank 24 is also present inside of the tires submerged therein. A cover 26 is then placed on the tank 24 so that the desired pressure may be developed and maintained therein, by means of water supply pipe 25. Communicating steam spaces 27 and 28 are arranged outside of the tank and cover and supplied with live steam by way of the steam pipe 29, the condensed steam flowing out by way of the outlet 30. The vulcanization and unification thus take place in this example under a heating operation effected by the introduction of live steam at the desired pressure and temperature which will be governed by the nature of the material to be vulcanized. The use of the steady inelastic pressure of a liquid will result in the application of the unifying force equally in all directions so that the rubber will virtually be forced into the cloth and the resulting tire or the like will have all of its parts firmly united not only at the sides but on the tread or outer periphery as well. The process is thus essentially different from the ordinary process of applying hydraulic pressure to the sides of two mold elements which are merely forced toward each other against the two lateral surfaces of the tire, which can exert no direct pressure where it is most needed, namely, on the tread portion inward toward the center.

I claim:—

1. Apparatus for vulcanizing and integrating tires and the like under water pressure, comprising in combination a perforated hollow core upon which the tire is built, a form for inclosing said tire and water inlet and air outlet pipes for said core, arranged one within the other.

2. The method of vulcanizing and integrating tires, hose and the like, which consists in building up the tire on a perforated hollow core, inclosing the tire in forms, displacing the air in said core with a liquid, sealing said core, placing the whole in a tank, submerging the same in a liquid, opening said seal to permit equalization of the liquid pressure inside and outside of said core, and increasing the liquid pressure to the desired degree.

3. The method of vulcanizing and integrating tires, hose and the like, which consists in building up the tire on a perforated hollow core, inclosing the tire in forms, displacing the air in said core with a liquid, sealing said core, placing the whole in a tank, submerging the same in a liquid, opening said seal to permit equalization of the liquid pressure inside and outside of said core, increasing the liquid pressure to the desired degree, and raising the temperature of the water to the desired degree.

MICHAEL SMITH.